(12) United States Patent
DePiro et al.

(10) Patent No.: US 10,645,988 B2
(45) Date of Patent: May 12, 2020

(54) METHOD FOR ATTACHING ELECTROLUMINESCENT WIRE TO SOLID SURFACE AND APPARATUS

(71) Applicants: Andrew Dana DePiro, Debary, FL (US); Evan Michael Stewart, Debary, FL (US)

(72) Inventors: Andrew Dana DePiro, Debary, FL (US); Evan Michael Stewart, Debary, FL (US)

( * ) Notice: Subject to any disclaimer, the term of this patent is extended or adjusted under 35 U.S.C. 154(b) by 0 days.

(21) Appl. No.: 16/264,639

(22) Filed: Jan. 31, 2019

(65) Prior Publication Data
US 2019/0231015 A1    Aug. 1, 2019

Related U.S. Application Data

(60) Provisional application No. 62/625,261, filed on Feb. 1, 2018.

(51) Int. Cl.
| | |
|---|---|
| *A42B 3/04* | (2006.01) |
| *H05B 33/10* | (2006.01) |
| *B29C 65/66* | (2006.01) |
| *A42B 1/24* | (2006.01) |
| *B29C 65/00* | (2006.01) |

(52) U.S. Cl.
CPC ............ *A42B 3/044* (2013.01); *A42B 1/244* (2013.01); *B29C 66/73715* (2013.01); *H05B 33/10* (2013.01)

(58) Field of Classification Search
CPC ..... A42B 3/044; A42B 3/0446; A42B 3/0453; A42B 1/242; A42B 1/244; H05B 33/10; B29C 65/66; B29C 66/73715; B32B 37/144

USPC ...................................... 156/84, 85, 86, 297
See application file for complete search history.

(56) References Cited

U.S. PATENT DOCUMENTS

| | | | | |
|---|---|---|---|---|
| 3,313,017 A * | 4/1967 | Zingali | ................... | H01F 21/02 29/606 |
| 5,570,946 A * | 11/1996 | Chien | .................... | A42B 3/044 362/106 |
| 5,810,467 A * | 9/1998 | Hurwitz | ................. | A42B 3/044 2/422 |
| 6,302,980 B1 * | 10/2001 | Kortenbach | ........... | H01B 7/285 156/48 |
| 6,547,788 B1 * | 4/2003 | Maguire | ................ | A61B 18/00 606/41 |
| 2006/0133068 A1 * | 6/2006 | Sherring | .................. | A42B 3/04 362/105 |
| 2007/0106172 A1 * | 5/2007 | Abreu | .................. | A61B 5/6821 600/549 |
| 2013/0174323 A1 * | 7/2013 | McFall | .................. | A42B 1/244 2/209.13 |

(Continued)

*Primary Examiner* — Alan B Cariaso
(74) *Attorney, Agent, or Firm* — Steven C. Stewart

(57) ABSTRACT

A method and apparatus to attach an Electroluminescent wire and power inverter to a helmet is disclosed. Dabs of hot glue are injected at various locations to form a pattern on a helmet top surface. Segments of heat shrink tubing are inserted into the injected hot glue on the surface to permit the heat shrink tubing segments to shrink and adhere to the helmet. Electroluminescent wire is inserted into the partially shrunk segments of heat shrink tubing. A power inverter is attached to the helmet and connected to the electroluminescent wire to create a light pattern.

12 Claims, 2 Drawing Sheets

(56) References Cited

U.S. PATENT DOCUMENTS

2018/0140034 A1\* 5/2018 Scott ..................... A42B 3/044

\* cited by examiner

METHOD FOR ATTACHING ELECTROLUMINESCENT WIRE TO SOLID SURFACE AND APPARATUS

RELATED APPLICATION

This application claims the benefit of U.S. provisional application No. 62/625,261, filed on Feb. 1, 2018, the contents of which are incorporated by reference.

TECHNICAL FIELD

These claimed embodiments relate to a method and apparatus for attaching an electroluminescent Wire to a Solid Surface.

BACKGROUND OF THE INVENTION

A method attaching an Electroluminescent Wire to a helmet is disclosed.

Lighting devices are often attached to helmets so that the helmet can be seen in the dark. When attaching lighting devices to helmets, such as motorcycle helmets, glue or other adhesive material may be used. The glue or other adhesive material may be spread on the helmet and then the lighting device (such as a light emitting diode (LED)) may be placed in the glue. When the lighting device is needed to be removed, the lighting device may be pulled away; however, often the material on the helmet, such as paint or decals are pulled away with the lighting device.

SUMMARY OF THE INVENTION

In one implementation a method is disclosed attaching electroluminescent wire to a Surface of a helmet. In the method hot glue is injected with a glue gun at various locations along a pattern onto a helmet surface. Segments of clear heat shrink tubing are connected with the injected hot glue resulting in the shrinkage of the heat shrink tubing segments. Electroluminescent wire is inserted into the partially shrunk heat shrink tubing segments, and an inverter is attached to the helmet and coupled to the electroluminescent wire.

In another implementation, a helmet is disclosed that includes segments of heat shrink tubing attached to the surface of the helmet with previously injected hot glue. The heat shrink tubing segments is operable to shrink shrank from contact with the heat of the hot glue. An electroluminescent wire extends into the partially shrunk heat shrunk tubing segments to form in a pattern above and adjacent to the top surface of the helmet. An inverter is attached to the helmet and electrically coupled to the electroluminescent wire such that when energy is emitted from the inverter, the electroluminescent wire illuminates.

In a further implementation an electroluminescent kit for attachment to a helmet is disclosed. The kit includes segments (or a continuous strand that may be cut into segments) of heat shrink tubing for attaching to the surface of the helmet with injected hot glue. The heat shrink tubing segments are operable to at least partially shrink from contact with the heat of the hot glue. An electroluminescent wire is included to extend into the plurality of partially shrunk heat shrink tubing segments to form in a pattern above and adjacent to the top surface of the helmet. An inverter is included to attach to the helmet to electrically couple to the electroluminescent wire such that when the inverter is turned on and energy is emitted from the inverter, the electroluminescent wire illuminates.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
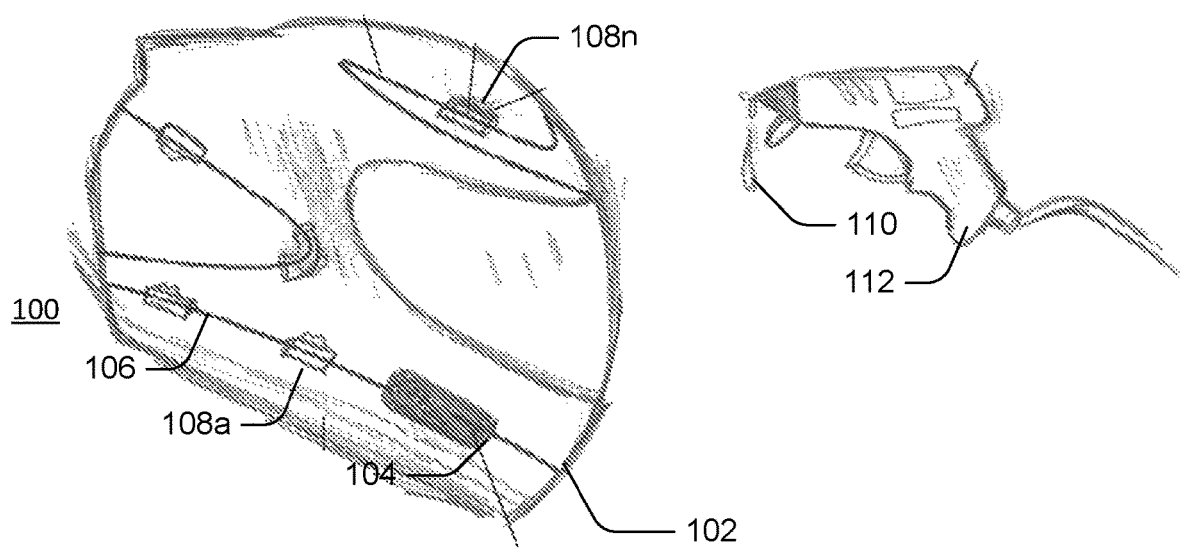
FIG. 1 is an elevated view of an Electroluminescent wire and transformer attached to a helmet in accordance with the disclosed embodiment.

Referring to FIG. 1, there is shown an electroluminescent system (or kit) 100 connected with a motorcycle helmet 102. The electroluminescent system 100 includes an inverter 104 coupled to an electroluminescent wire 106 to extend through clear segments of heat shrink tubing 108a-108n. Each of the segments of heat shrink tubing 108a-108n is attached to helmet 102 with hot glue 110 that is applied with glue gun 112. A predetermined pattern template on a paper (paper may be replaced with a plastic sheet or any sheet of flexible thin material) may be provided (not shown). The pattern template may include holes/apertures at various locations along the pattern on the paper to indicate where to place a dab hot glue (or mark where glue is to be placed) when the paper is laid over on the surface of the helmet 102. In one implementation, the kit 100 may include a hot melt gun 110 and glue.

Exemplary clear heat shrink tubing 108 includes ⅛-inch clear flexible polyolfin in 100 foot and 500-foot reals, made by Sumitomo company of China. Exemplary electroluminescent wire includes part number 355211-AA1, made by Shenzhen FineGreen Lighting Co., Ltd. of Guangong China. Exemplary hot glue 110 and gun includes 20W Electric Heating Hot Melt Glue Gun, part number 3k-q508 hot melt gun, made by Sinfoo company of Guangdong, China.

Glue gun 112 may inject dabs (or a small amount, in one implementation the length of a dab of hot glue is the length of a segment heat shrink tubing 108a-108n) of hot glue 110 at various spaced apart locations on helmet 102 to form a pattern or design. Each of the segments of heat shrink tubing 108a-108n and a combination power inverter/dc regulator and power source 104 (referred to herein as "inverter") is placed on the hot glue 110 at various locations (preferably about 6" apart) on or above a top surface of the helmet 102 along the pattern. In one implementation the length of a segment of tubing is less than 1" and in one implementation about ⅛".

Each of the segments of heat shrink tubing 108a-108n are allowed to shrink/partially collapse due to the heat of the glue. The electroluminescent wire 106 is then injected into the partially collapsed segments of heat shrink tubing 108a-108n to form a design. The inverter/power source 104 may then be electrically connected to the wire 106 at one end. In one implementation the inverter may include and on/off switch to turn on or off the illumination of the electroluminescent wire 106. During operation the inverter/power source 104 is turned on to illuminate the electroluminescent wire 106 on the helmet 102. In one implementation the power source within the inverter 104 is a battery.

Figure 2:
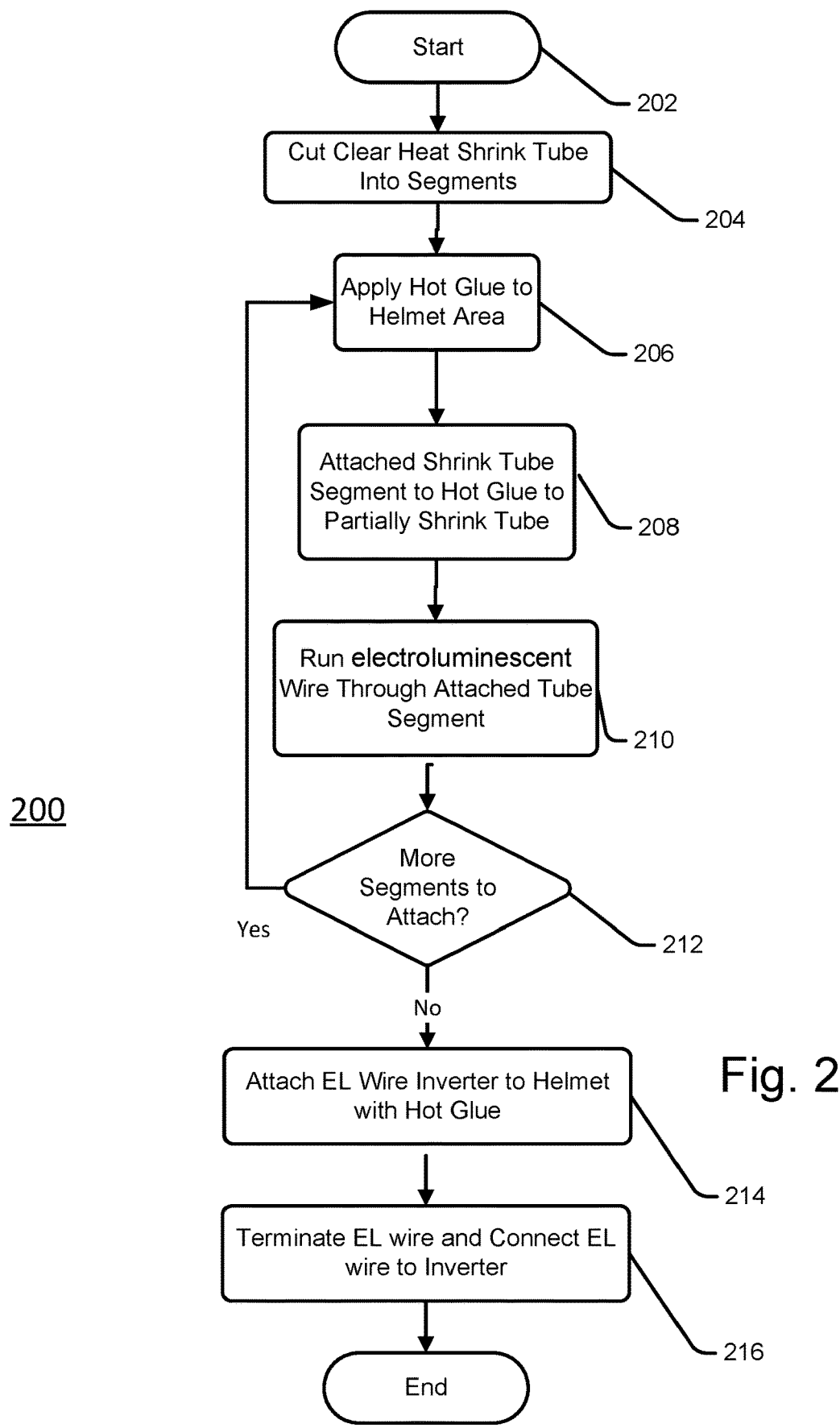
FIG. 2 is a flow chart of the process for attaching an Electroluminescent wire and transformer to the helmet shown in FIG. 1.

Illustrated in FIG. 2, there is shown a process 200 for attaching an Electroluminescent wire and transformer to the helmet 100 (FIG. 1). The exemplary process in FIG. 2 is illustrated as a collection of blocks in a logical flow diagram, which represents a sequence of operations that can be implemented to attach an electroluminescent wire to any surface of a solid object, including exemplary helmet 100. The order in which the operations are described is not intended to be construed as a limitation, and any number of the described blocks can be combined in any order and/or in parallel to implement the process. For discussion purposes, the processes are described with reference to FIG. 1, although it may be implemented the attaching an Electroluminescent wire and transformer to any solid surface.

Referring to FIG. 2, a process 200 is shown for attaching an Electroluminescent wire 106 and transformer/inverter 104 to a helmet 102 shown in FIG. 1. The process starts 200 in block 202.

In the process 200 in block 204, Clear heat shrink tubing 108a-108n is cut in segments. A pattern to show an illuminated design may then be sketched along helmet 102 using a pencil, pen, etching device or other marking utensil.

In block 206, a dab of hot glue is applied to one of various periodically spaced locations on helmet 102 along the pattern using hot glue gun 112.

In block 208, one of the segments of heat shrink tubing 108a-108n is individually applied to the hot glue to partially shrink the segments of heat shrink tubing 108a-108n.

In block 210, electroluminescent Wire is run through the attached partially shrunk segments of heat shrink tubing 108a-108n.

In block 212, a determination is made as to whether there are more segments 108a-108n of heat shrink tubing to be applied to the helmet 102. If there are more segments of tubing 108a-108n of heat shrink tubing to be applied to the helmet 102, then block 206 hot glue is applied to another location on the helmet 102 along the pattern. If there are not more segments of tubing 108a-108n of heat shrink tubing to be applied to the helmet 102, then the EL Wire Inverter 104 is attached to helmet 102 with Hot Glue using hot glue gun in block 214. In one implementation, the segments of heat shrink tubing 108a-n may be spaced at least 1 inch apart, and preferably 6 inches apart.

In block 216, the Electroluminescent wire 106 is terminated (by placing or gluing an end cap over the Electroluminescent wire 106) and the Electroluminescent wire 106 is connected to the inverter 104.

Electroluminescent wire 106 is illuminating by turning on inverter 104. In one implementation the inverter 104 may be turned on and off using an on/off switch. In one implementation when electroluminescent wire 106 is turned on, the surface of the helmet is illuminated to form the sketched pattern.

Electroluminescent wire 106 and inverter 104 may be removed from helmet 102 by heating up glue on helmet 102 using a heat source such that the glue may become soft enough to easily pull away electroluminescent wire 106 (with segments of heat shrink tubing) and inverter without damaging paint or decals on the surface of the helmet 102.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion but should be defined by the appended claims.

What is claimed is:

1. A method for attaching an electroluminescent wire and transformer to a helmet comprising:
   injecting hot glue at various locations onto a helmet surface;
   placing segments of heat shrink tubing in contact with the injected hot glue to permit the segments of heat shrink tubing to shrink as a result of the heat of the hot glue;
   inserting electroluminescent wire into the partially shrunk segments of heat shrink tubing; and
   connecting an inverter attached to the helmet to the electroluminescent wire.

2. The method as recited in claim 1 wherein the hot glue is injected on a top surface of the helmet using a hot glue gun.

3. The method as recited in claim 1 further comprising attaching the inverter to the helmet with hot glue.

4. The method as recited in claim 1 further comprising:
   sketching a pattern into the helmet using a marking utensil; and
   injecting the hot glue onto a helmet surface at various locations on the sketched pattern.

5. The method as recited in claim 4 further comprising:
   placing the segments into the hot glue at periodic intervals along the sketched pattern.

6. The method as recited in claim 1 further comprising:
   heating up glue on the helmet using a heat source; and
   removing the electroluminescent wire and inverter from the helmet adjacent the heated glue.

7. A helmet comprising:
   a plurality of segments of heat shrink tubing attached to the surface of the helmet with previously injected hot glue, wherein the segments of heat shrink tubing shrank from contact with the heat of the hot glue;
   an electroluminescent wire extending into the plurality of partially shrunk segments of heat shrink tubing to form in a pattern above and adjacent to the top surface of the helmet; and
   an inverter attached to the helmet and electrically coupled to the electroluminescent wire such that when energy is emitted from the inverter, the electroluminescent wire illuminates.

8. The helmet as recited in claim 7 wherein the segments are disposed on the surface of the helmet at periodic intervals along a sketched pattern.

9. The helmet as recited in claim 7 wherein inverter includes a battery and an on/off switch to activate and deactivate illumination of the electroluminescent wire on the helmet.

10. An electroluminescent kit for attachment to a helmet, the kit comprising:
    a plurality of segments of heat shrink tubing for attaching to the surface of the helmet with injected hot glue, wherein the segments of heat shrink tubing are operable to at least partially shrink from contact with the heat of the hot glue;
    an electroluminescent wire to extend into the plurality of partially shrunk segments of heat shrink tubing to form in a pattern above and adjacent to the top surface of the helmet; and
    an inverter to attach to the helmet to electrically couple to the electroluminescent wire such that when energy is emitted from the inverter, the electroluminescent wire illuminates.

11. The kit as recited in claim 10 further comprising a paper pattern template having a plurality of holes along a pattern, the paper pattern for placing over top surface of the helmet to allow marking locations on the helmet of where to inject the hot glue.

12. The kit as recited in claim 11 further comprising a hot melt gun to melt the glue and inject a dab of hot glue on the surface of the helmet at the marked locations.

\* \* \* \* \*